(12) United States Patent
Nastacio

(10) Patent No.: US 8,661,113 B2
(45) Date of Patent: Feb. 25, 2014

(54) CROSS-CUTTING DETECTION OF EVENT PATTERNS

(75) Inventor: Denilson Nastacio, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1575 days.

(21) Appl. No.: 11/382,364

(22) Filed: May 9, 2006

(65) Prior Publication Data

US 2007/0266142 A1    Nov. 15, 2007

(51) Int. Cl.
*G06F 15/173* (2006.01)

(52) U.S. Cl.
USPC .............................. 709/224; 709/200; 706/47

(58) Field of Classification Search
USPC ............... 709/224, 200, 202, 223; 706/47, 48
See application file for complete search history.

(56) References Cited

U.S. PATENT DOCUMENTS

| | | | |
|---|---|---|---|
| 5,483,153 A | 1/1996 | Leeb et al. | |
| 5,691,917 A * | 11/1997 | Harrison | 717/127 |
| 5,761,502 A | 6/1998 | Jacobs | |
| 6,154,849 A * | 11/2000 | Xia | 714/4 |
| 6,336,139 B1 | 1/2002 | Feridun et al. | |
| 6,370,520 B1 | 4/2002 | Ruutu et al. | |
| 6,446,136 B1 * | 9/2002 | Pohlmann et al. | 719/318 |
| 6,629,106 B1 | 9/2003 | Narayanaswamy et al. | |
| 6,697,791 B2 | 2/2004 | Hellerstein et al. | |
| 6,742,143 B2 * | 5/2004 | Kaler et al. | 714/39 |
| 6,766,368 B1 * | 7/2004 | Jakobson et al. | 709/224 |
| 6,807,583 B2 * | 10/2004 | Hrischuk et al. | 719/318 |
| 6,868,367 B2 * | 3/2005 | Yemini et al. | 702/183 |
| 6,941,557 B1 * | 9/2005 | Jakobson et al. | 719/316 |
| 6,963,806 B2 | 11/2005 | Gulati | |
| 6,996,551 B2 * | 2/2006 | Hellerstein et al. | 706/48 |
| 7,117,191 B2 * | 10/2006 | Gavan et al. | 706/47 |
| 7,124,180 B1 * | 10/2006 | Ranous | 709/224 |
| 7,131,032 B2 * | 10/2006 | Gibson et al. | 714/26 |
| 7,131,037 B1 * | 10/2006 | LeFaive et al. | 714/46 |
| 7,221,987 B2 * | 5/2007 | Bett et al. | 700/108 |
| 7,250,944 B2 * | 7/2007 | Anderson et al. | 345/419 |
| 7,352,280 B1 * | 4/2008 | Rockwood | 340/521 |
| 7,363,656 B2 * | 4/2008 | Weber et al. | 726/23 |
| 2004/0024773 A1 * | 2/2004 | Stoffel et al. | 707/102 |
| 2005/0172306 A1 * | 8/2005 | Agarwal et al. | 719/328 |
| 2005/0283680 A1 * | 12/2005 | Kobayashi et al. | 714/39 |
| 2007/0156916 A1 * | 7/2007 | Schiefer | 709/232 |

OTHER PUBLICATIONS

Aboelela et al., Fuzzy Temporal Reasoning Model for Event Correlation in Network Management, Oct. 1999.*

* cited by examiner

*Primary Examiner* — El Hadji Sall
(74) *Attorney, Agent, or Firm* — Steven Greenberg, Esq.; Carey, Rodriguez, Greenberg & O'Keefe

(57) ABSTRACT

Embodiments of the present invention provide a method, system and computer program product for the detection of correlation rules in an enterprise computing monitoring and management system. In one embodiment of the invention, a method for detection of correlation rules can be provided. The method can include receiving events from multiple event sources, classifying the events according to a set of event attributes, determining a temporal proximity of occurrence of different classified events, further determining a frequency of occurrence of temporal proximity for particular classified events, and reporting a causal relationship between the particular classified events when the frequency of occurrence exceeds a threshold value.

16 Claims, 2 Drawing Sheets

CROSS-CUTTING DETECTION OF EVENT PATTERNS

BACKGROUND OF THE INVENTION

1. Field of the Invention

The present invention relates to enterprise computing monitoring and management, and more particularly to event processing in an enterprise computing monitoring and management system.

2. Description of the Related Art

Enterprise computing monitoring relates to the monitoring of the state of the different, granular components of an enterprise computing environment, as well as the state of the enterprise computing environment in the aggregate. Generally intended for use by network and application administrators, enterprise computing monitoring systems monitor selected elements in the network of components forming the enterprise computing environment. Enterprise computing monitoring systems are traditionally organized in a hierarchical fashion, with sensors distributed throughout the network of components forming the enterprise computing environment. These sensors relay monitored events to aggregation nodes, which in turn can relay the monitored events to a smaller set of aggregation nodes. Monitored events can be interpreted, translated and provided to interacting administrators in order to facilitate the management of the enterprise computing environment.

A skeletal enterprise monitoring system can collect events propagated from different levels of the hierarchy of nodes defining the enterprise computing monitoring system. The collected events, in turn, can be reported plainly through a user interface in a monitoring application and it remains incumbent upon the user to interpret and act upon the reported events. Given the complexity of the modern enterprise computing environment, however, commercially viable enterprise monitoring systems provide an enhanced degree of event interpretation and remedial, automated action taking.

Clearly, nodes in the hierarchy of an enterprise monitoring system can be interrelated such that events occurring in a child node of the hierarchy can form the root cause of other events originating at higher levels of the hierarchy in parent nodes. Consequently, plainly reporting every event arising in the hierarchy can result in an event flood and can quickly overwhelm the enterprise computing monitoring system. Of course, capturing every event stemming from a root cause event is not as helpful as correcting the root cause event. In particular, resolving the cause of root cause event in the event source invariably leads to the resolving of all other resulting events.

To achieve efficiencies in monitoring, event correlation engines can be embedded within nodes in the network of elements of the enterprise computing environment. Consequently, the event correlation engines can most quickly identify and handle events arising from within the node without depending upon event correlation engines higher in the hierarchy of enterprise computing monitoring systems to process these events. In this regard, correlation rules applied by event correlation engines generally trigger responsive events for detected events. Yet, in many cases, important event patterns can be detected only at a higher level in the hierarchy. In the latter circumstance, it is desirable to place an event correlation engine at a higher level in the hierarchy so as to capture and process events stemming from many different nodes below.

Correlation rules often are composed by domain experts and processed by a correlation engine at a selected level in the hierarchy of the enterprise computing monitoring system so as to achieve optimal efficiency in processing events below. Coordinating the deployment of correlation rules can be challenging in an expansive enterprise computing environment. Consequently, in many enterprise systems, the correlation engine is centralized at a highest level in the hierarchy such that all events generated in environment can be captured and processed in the correlation engine. Notwithstanding, scalability will be sacrificed in this circumstance.

BRIEF SUMMARY OF THE INVENTION

Embodiments of the present invention address deficiencies of the art in respect to event correlation management and provide a novel and non-obvious method, system and computer program product for the detection of event correlation rules in an enterprise computing monitoring and management system. In one embodiment, an enterprise computing monitoring and management data processing system can be provided. The enterprise computing monitoring and management data processing system can include an event management computing platform coupled to a computing hierarchy of multiple nodes via an event bus.

Event processing logic can be disposed in the event management computing platform. The event processing logic can include program code enabled to collect events from different ones of the multiple nodes. The system also can include proximity detection logic. The proximity detection logic can include program code enabled to correlate different ones of the events of differing attribute sets according to temporal proximity and to determine a causal relationship based upon a frequency of temporally proximate occurrence of the different ones of the events of differing attribute sets. Finally, the system can include a time based rolling window configured to display the different ones of the events of differing attribute sets in a specified time frame.

In one aspect of the embodiment, the time based rolling window further can be configured to display the different ones of the events of differing attribute sets in a specified time frame along parallel lines for different event source attributes. In this regard, the differing attribute sets can include different sets of source, severity and type attributes. Finally, in another aspect of the embodiment, the time based rolling window yet further can be configured to display the different ones of the events of differing attribute sets in a specified time frame according to different display characteristics for each event instance having a particular one of the differing attribute sets.

In another embodiment of the invention, a method for detection of event correlation rules can be provided. The method can include receiving events from multiple event sources over an event bus, classifying the events according to a set of event attributes, determining a temporal proximity of occurrence of different classified events, further determining a frequency of occurrence of temporal proximity for particular classified events, and reporting a causal relationship between the particular classified events when the frequency of occurrence exceeds a threshold value.

Classifying a plurality of the events according to a set of event attributes can include classifying the events according to a set of event attributes selected from the group consisting of source, severity and type. The method further can include rendering the different classified events in a time based rolling window for a specified time frame. In one aspect of the embodiment, rendering the different classified events in a time based rolling window for a specified time frame can include rendering the different classified events utilizing different display characteristics for each of the classified events according to a corresponding attribute set.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL
VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for the detection of event correlation rules in an enterprise computing monitoring and management data processing system. In accordance with an embodiment of the present invention, events can be received from nodes in an event hierarchy and classified according to a combination of event attributes. Once classified, events can be rendered in a time based rolling window along with other events of similar and different classifications. After a period of time, consequential relationships between events of different classifications can be determined and reported by reference to the repeated time based occurrence of consecutive events of different classifications.

Figure 1:
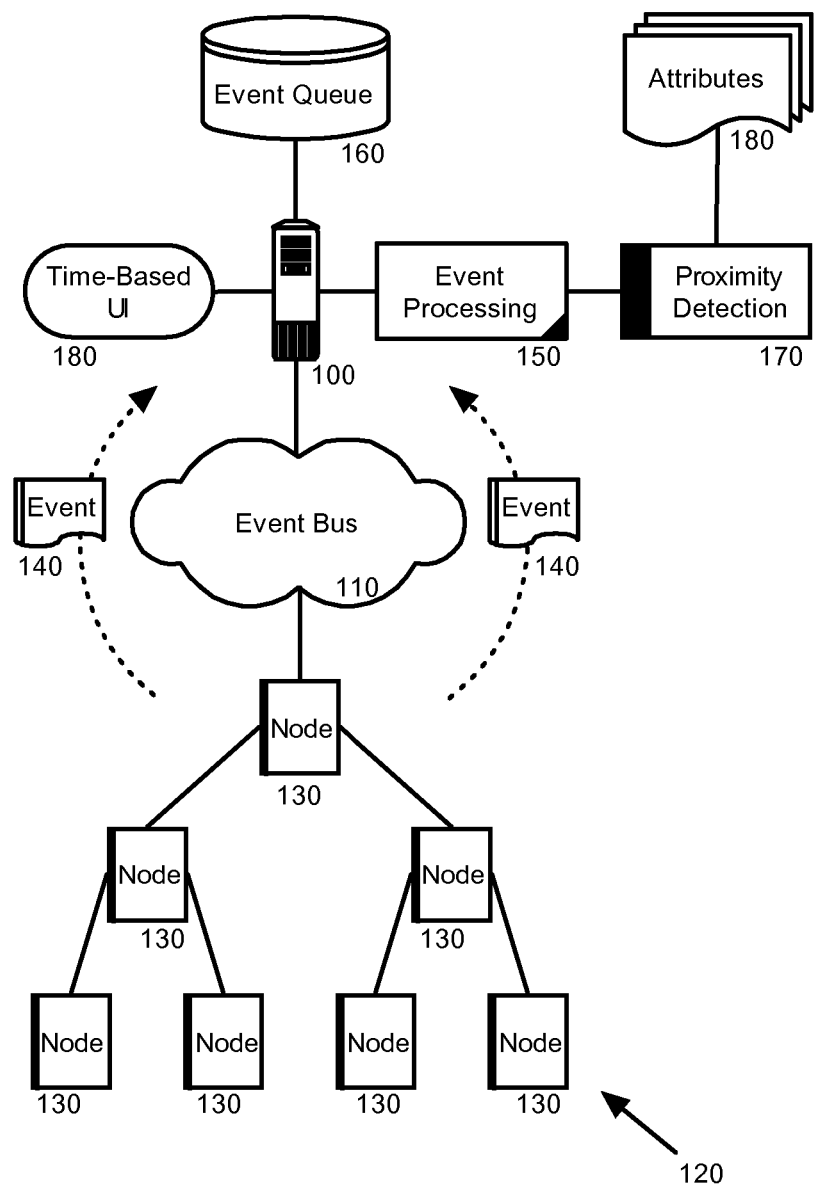
FIG. 1 is a schematic illustration of an enterprise computing monitoring and management data processing system configured for the detection of event correlation rules.

In illustration, FIG. 1 is a schematic illustration of an enterprise computing monitoring and management data processing system configured for the detection of event correlation rules. The data processing system can include an event management computing platform 100 coupled to a computing hierarchy 120 of multiple nodes 130 including hardware computing devices such as server platforms and software logic devices such as application servers and database management systems. Events 140 originating in the nodes 130 of the hierarchy 120 can flow over an event bus 110 to the event management computing platform 100 for processing with event processing logic 150. In this regard, the event processing logic 150 can include program code enabled to collect events from different nodes 130 and provide a user interface for viewing metrics associated with the events.

Notably, an event queue 160 can be coupled to the event management computing platform 100 and can store incoming events according to classification. The classification can include a combination of event attributes 180 such as severity, source and situation. Proximity detection logic 170 coupled to event processing logic 150 can render the occurrence of differently classified events within a time based rolling window 190 so as to provide a visual representation of the causal effect of an event of one type of classification upon events of a different type of classification. Each event of a particular classification can include a visual representation indicative of the classification, such as a color, shading, pattern, shape or textual indicia, to name a few.

Utilizing, the time based rolling window, it will be apparent to the skilled artisan when events 140 having one set of event attributes 180 are closely related to temporally proximate ones of the events 140 have a different set of event attributes 180. In this regard, a high frequency of two different types of events 140 having different event attributes occurring closely in time to one another can indicate a causal relationship between the events of differing event attributes. Importantly, the causal relationship can be determined across multiple different event sources, thus detecting a correlation rule that can be shown to a systems administrator to highlight an otherwise unnoticeable event pattern in the enterprise computing environment.

As an example, a causal relationship can be established for the observation that a high percentage of occurrences of a high severity event from a first source under a particular situation are followed by a high severity event from a second source with a certain period of time. Likewise, a causal relationship can be established for the observation that a substantial percentage of high severity events from the second source are preceded by a high severity event from the first source under the particular situation. Optionally, where the percentage of occurrences of an event approach 100%, an automated correlation rule can be created so that events occurring nearly 100% of the time in relation to a second event are deemed to have been caused by the second event, or to have caused the second event as the case may be.

Figure 2:
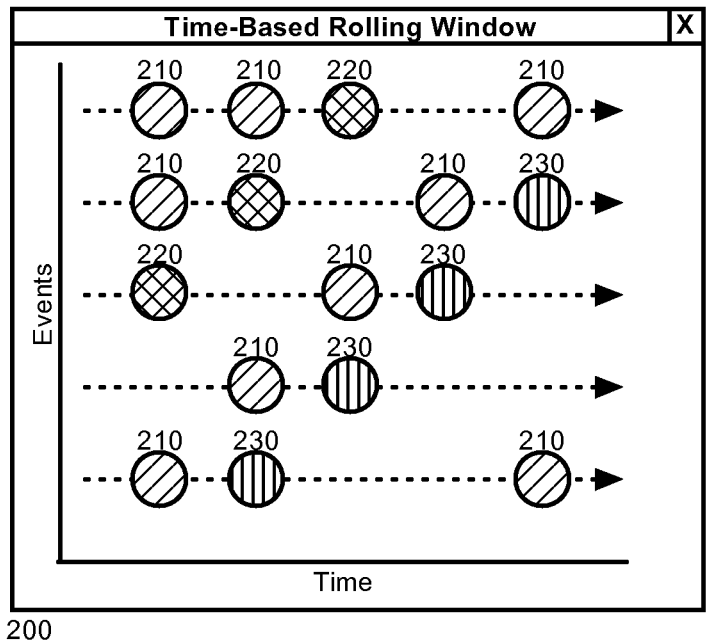
FIG. 2 is a pictorial illustration of a time based rolling window for use in the data processing system of FIG. 1; and, FIG. 3 is a flow chart illustrating a process for the detection of event correlation rules in the data processing system of FIG. 1.

In more particular illustration of the structure and function of the time based rolling window, FIG. 2 is a pictorial illustration of a time based rolling window for use in the data processing system of FIG. 1. The time based rolling window 200 can include a set of parallel time lines having multiple event instances 210, 220, 230 of different attribute sets. Each of the multiple event instances 210, 220, 230 of different attribute sets can be visually presented differently so as to indicate an event of a particular attribute set. To the extent that multiple event attributes are grouped together into a set, then textual indicia rather than graphical indicia can provide nearly an unlimited set of different visual presentations for the multiple event instances 210, 220, 230 of different attribute sets.

As it will be apparent from viewing the time based rolling window 200, different event instances 210, 220, 230 can be identified and the temporal proximity of the occurrence of the different event instances 210, 220, 230 can be gauged, either manually, or in an automated fashion. In particular, the frequency in which two of the multiple event instances 210, 220, 230 of different attribute sets occurs in close temporal proximity can be determined. As the frequency of occurrence increases, a causal relationship between the earlier occurring one of the multiple event instances 210, 220, 230 of different attribute sets can be identified, irrespective of the source of the earlier occurring one of the multiple event instances 210, 220, 230 of different attribute sets.

Figure 3:
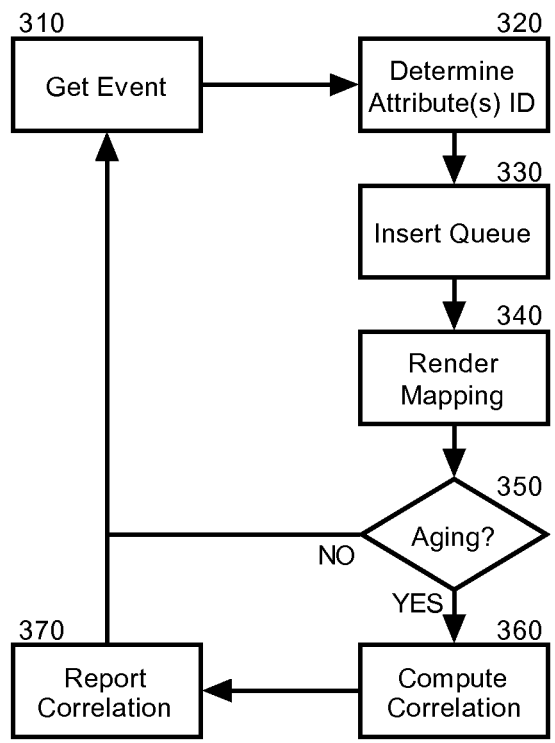

Referring now to FIG. 3, a flow chart is shown illustrating a process for the detection of event correlation rules in the data processing system of FIG. 1. Beginning in block 310, an event instance can be received and in block 320 the value of the attribute or attributes for the event instance can be determined. For example, the attributes can include the source of the event instance, the type of event instance and the severity of the event instance. In block 330, the event instance can be inserted in a queue for event instances having the particular set of attribute values. Thereafter, in block 340 the event instance can be rendered within the mapping reflected within the time based rolling window.

In decision block 350, it can be determined whether any of the event instances in the mapping have aged beyond the time frame defined for the time based rolling window. If so, those event instances can be removed from the queue and in block 360, event correlation and detection can initiate. In event correlation and detection, the event instances in the different queues can be compared to identify the lapse in time between different event instances and the frequency in which event instances occur in close temporal proximity to other event instances. Thereafter in block 370 any correlations detected can be reported including any causal relationships determined from high frequency values for particular event instance pairs.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk- read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

I claim:

1. An enterprise computing monitoring and management data processing system comprising:
    an event management computing platform coupled to a computing hierarchy of multiple nodes;
    event processing logic disposed in the event management computing platform, the event processing logic comprising program code enabled to collect a plurality of events from different ones of the multiple nodes;
    proximity detection logic comprising program code enabled to classify the plurality of the events according to a set of event attributes;
        determine a temporal proximity of occurrence of first and second classified events;
        further determine a frequency of occurrence of the temporal proximity between the first and the second classified events; and,
        report a causal relationship, not previously identified, between the first and the second classified events when the frequency of occurrence exceeds a threshold value; and
    a time based rolling window configured to display the different ones of the events of differing attribute sets in a specified time frame along parallel lines for different event source attributes.

2. The system of claim 1, wherein the differing attribute sets comprises different sets of source, severity and type attributes.

3. The system of claim 1, further comprising a plurality of queues, each corresponding to a different one of the differing attribute sets, each further storing only event instances within the specified time frame.

4. The system of claim 1, wherein the time based rolling window is further configured to display the different ones of the events of differing attribute sets in a specified time frame according to different display characteristics for each event instance having a particular one of the differing attribute sets.

5. A method for the detection of event correlation rules, the method comprising:
    receiving a plurality of events from multiple event sources in a computer hierarchy of multiple nodes;
    classifying the plurality of the events according to a set of event attributes;
    determining a temporal proximity of occurrence of first and second classified events;
    further determining a frequency of occurrence of the temporal proximity between the first and the second classified events;
    reporting a causal relationship, not previously identified, between the first and the second classified events when the frequency of occurrence exceeds a threshold value; and
    rendering the different classified events in a time based rolling window for a specified time frame.

6. The method of claim 5, wherein classifying a plurality of the events according to a set of event attributes, comprises classifying a plurality of the events according to a set of event attributes selected from the group consisting of source, severity and type.

7. The method of claim 5, wherein rendering the different classified events in a time based rolling window for a specified time frame, comprises rendering the different classified events utilizing different display characteristics for each of the classified events according to a corresponding attribute set.

8. The method of claim 5, wherein receiving a plurality of events from multiple event sources over an event bus, further comprises queuing different events of different attribute sets in different queues each corresponding to a different attribute set.

9. The method of claim 5, wherein the reporting comprises reporting, for first and second classified events, a percentage of occurrences of the first classified event for a first specified source that either precede or follow occurrences of a second classified event for a second specified source.

10. The method of claim 5, wherein the reporting comprises creating a correlation rule upon the frequency of occurrence approaches one-hundred percent (100%).

11. A computer program product comprising a computer usable storage medium embodying computer usable program code for the detection of event correlation rules, the computer program product including:
   computer usable program code for receiving a plurality of events from multiple event sources in a computer hierarchy of multiple nodes;
   computer usable program code for classifying the plurality of the events according to a set of event attributes;
   computer usable program code for determining a temporal proximity of occurrence of first and second classified events;
   computer usable program code for further determining a frequency of occurrence of the temporal proximity between the first and the second classified events;
   computer usable program code for reporting a causal relationship, not previously identified, between the first and the second classified events when the frequency of occurrence exceeds a threshold value; and
   computer usable program code for rendering the different classified events in a time based rolling window for a specified time frame.

12. The computer program product of claim 11, wherein the computer usable program code for classifying a plurality of the events according to a set of event attributes, comprises computer usable program code for classifying a plurality of the events according to a set of event attributes selected from the group consisting of source, severity and type.

13. The computer program product of claim 11, wherein the computer usable program code for rendering the different classified events in a time based rolling window for a specified time frame, comprises computer usable program code for rendering the different classified events utilizing different display characteristics for each of the classified events according to a corresponding attribute set.

14. The computer program product of claim 11, wherein the computer usable program code for receiving a plurality of events from multiple event sources over an event bus, further comprises computer usable program code for queuing different events of different attribute sets in different queues each corresponding to a different attribute set.

15. The computer program product of claim 11, wherein the computer usable program code for the reporting comprises reporting, for first and second classified events, a percentage of occurrences of the first classified event for a first specified source that either precede or follow occurrences of a second classified event for a second specified source.

16. The computer program product of claim 11, wherein the computer usable program code for the reporting comprises creating a correlation rule upon the frequency of occurrence approaches one-hundred percent (100%).

* * * * *